(12) United States Patent
Clarner et al.

(10) Patent No.: US 7,275,290 B2
(45) Date of Patent: Oct. 2, 2007

(54) TOUCH FASTENERS

(75) Inventors: Mark A. Clarner, Concord, NH (US); George A. Provost, Litchfield, NH (US); William L. Huber, Pittsfield, NH (US)

(73) Assignee: Velcro Industries B.V., Curacao (AN)

( * ) Notice: Subject to any disclaimer, the term of this patent is extended or adjusted under 35 U.S.C. 154(b) by 66 days.

(21) Appl. No.: 10/890,010

(22) Filed: Jul. 13, 2004

(65) Prior Publication Data

US 2005/0177986 A1      Aug. 18, 2005

Related U.S. Application Data

(63) Continuation-in-part of application No. 10/455,240, filed on Jun. 4, 2003, now Pat. No. 7,052,638.

(51) Int. Cl.
    *A44B 18/00* (2006.01)
(52) U.S. Cl. ................................................. 24/452
(58) Field of Classification Search ................. 24/442, 24/450, 452, 449; 428/99, 100; 604/391
    See application file for complete search history.

(56) References Cited

U.S. PATENT DOCUMENTS

| | | | |
|---|---|---|---|
| 2,820,877 A | 1/1958 | Oates, Jr. ........................ 219/25 |
| 3,138,841 A | 6/1964 | Naimer .......................... 24/204 |
| 3,191,255 A | 6/1965 | Nealis | |
| 3,192,589 A | 7/1965 | Pearson | |
| 3,266,113 A | 8/1966 | Flanagan, Jr. ................. 24/204 |
| 3,312,583 A | 4/1967 | Rochlis .......................... 161/62 |
| 3,399,425 A | 9/1968 | Lemmelson ..................... 18/10 |
| 3,408,705 A | 11/1968 | Keyser et al. .................. 24/204 |
| 3,527,001 A | 9/1970 | Kleemeier et al. ............. 51/358 |
| 3,557,407 A | 1/1971 | Lemelson ........................ 18/10 |
| 3,708,837 A | 1/1973 | Chiba | |
| 3,718,725 A | 2/1973 | Hamano ....................... 264/163 |
| 3,808,648 A | 5/1974 | Billarant et al. ............... 24/204 |
| 4,001,366 A | 1/1977 | Brumlik ....................... 264/147 |
| 4,169,303 A | 10/1979 | Lemelson ...................... 24/204 |
| 4,290,174 A | 9/1981 | Kalleberg ..................... 24/204 |
| 4,454,183 A | 6/1984 | Wollman | |
| 4,775,310 A | 10/1988 | Fischer ......................... 425/308 |
| 4,794,028 A | 12/1988 | Fischer ......................... 428/100 |
| 4,880,589 A | 11/1989 | Shigemoto et al. .......... 264/216 |
| 4,894,060 A | 1/1990 | Nestegard .................... 604/391 |
| 5,076,793 A | 12/1991 | Aghevli et al. .............. 434/196 |
| 5,077,870 A | 1/1992 | Melbye et al. ................. 24/452 |
| 5,396,687 A | 3/1995 | Osterman ...................... 24/449 |
| 5,505,747 A | 4/1996 | Chesley et al. ................ 51/297 |

(Continued)

FOREIGN PATENT DOCUMENTS

DE      2 213 686      3/1972

(Continued)

OTHER PUBLICATIONS

US 6,129,874, 10/2000, Buzzell et al. (withdrawn)

*Primary Examiner*—James R Brittain
(74) *Attorney, Agent, or Firm*—Fish & Richardson P.C.

(57) ABSTRACT

Molded male touch fastener components, and methods of making such components are disclosed. Components include multiple, discrete features that extend laterally from a common side of an upper end of a formation, for engagement of loops.

33 Claims, 15 Drawing Sheets

U.S. PATENT DOCUMENTS

| | | |
|---|---|---|
| 5,607,635 A | 3/1997 | Melbye et al. ............... 264/169 |
| 5,657,516 A | 8/1997 | Berg et al. .................... 24/452 |
| 5,671,512 A | 9/1997 | Hattori et al. |
| 5,679,302 A | 10/1997 | Miller et al. |
| 5,713,111 A | 2/1998 | Hattori et al. |
| 5,749,129 A | 5/1998 | Murasaki et al. |
| 5,755,015 A | 5/1998 | Akeno et al. .................. 24/452 |
| 5,781,969 A | 7/1998 | Akeno et al. |
| 5,792,408 A | 8/1998 | Akeno et al. ............... 264/284 |
| 5,800,845 A | 9/1998 | Akeno et al. ............... 425/224 |
| 5,845,375 A | 12/1998 | Miller et al. .................. 24/452 |
| 5,868,987 A | 2/1999 | Kampfer et al. ............ 264/280 |
| 5,879,604 A | 3/1999 | Melbye et al. .............. 264/167 |
| 5,884,374 A | 3/1999 | Clune .......................... 24/446 |
| 5,913,482 A | 6/1999 | Akeno |
| 5,933,927 A | 8/1999 | Miller et al. .................. 24/452 |
| 5,951,931 A | 9/1999 | Murasaki et al. ........... 264/167 |
| 5,953,797 A | 9/1999 | Provost et al. ................ 24/452 |
| 5,981,027 A | 11/1999 | Parallada .................... 428/120 |
| 6,000,106 A | 12/1999 | Kampfer et al. .............. 24/452 |
| 6,039,911 A | 3/2000 | Miller et al. ................ 264/280 |
| 6,054,091 A | 4/2000 | Miller et al. ................ 264/442 |
| 6,162,040 A | 12/2000 | Clune ......................... 425/363 |
| 6,248,276 B1 | 6/2001 | Parellada ................... 264/167 |
| 6,287,665 B1 | 9/2001 | Hammer .................... 428/100 |
| 2001/0018110 A1 | 8/2001 | Tuman et al. ................. 428/99 |
| 2002/0069495 A1 | 6/2002 | Murasaki |
| 2002/0124359 A1* | 9/2002 | Murasaki et al. ............. 24/452 |
| 2003/0074771 A1* | 4/2003 | Duffy ......................... 24/442 |
| 2003/0106188 A1* | 6/2003 | Armela et al. ................ 24/451 |

FOREIGN PATENT DOCUMENTS

| | | |
|---|---|---|
| DE | 296 08 260 | 5/1996 |
| DE | 198 28 856 | 6/1998 |
| DE | 100.56.567 | 11/2000 |
| EP | 0 806 158 | 3/1997 |
| EP | 0 811 331 A2 | 12/1997 |
| EP | 0 811 332 | 12/1997 |
| GB | 2 115 481 | 9/1986 |
| GB | 2 279 106 | 12/1994 |
| GB | 2 349 354 | 11/2000 |
| JP | 4-286029 | 10/1922 |
| WO | WO82/02480 | 8/1982 |
| WO | WO92/04839 | 4/1992 |
| WO | WO94/23610 | 10/1994 |
| WO | WO98/14086 | 4/1998 |
| WO | WO98/30381 | 7/1998 |
| WO | WO98/57564 | 12/1998 |
| WO | WO98/57565 | 12/1998 |
| WO | WO99/10161 | 3/1999 |
| WO | WO99/26507 | 6/1999 |
| WO | WO 00/41479 | 7/2000 |
| WO | WO 01/24654 | 4/2001 |
| WO | WO 02/45536 A2 | 6/2002 |
| WO | WO 03/028499 A1 | 10/2003 |

* cited by examiner

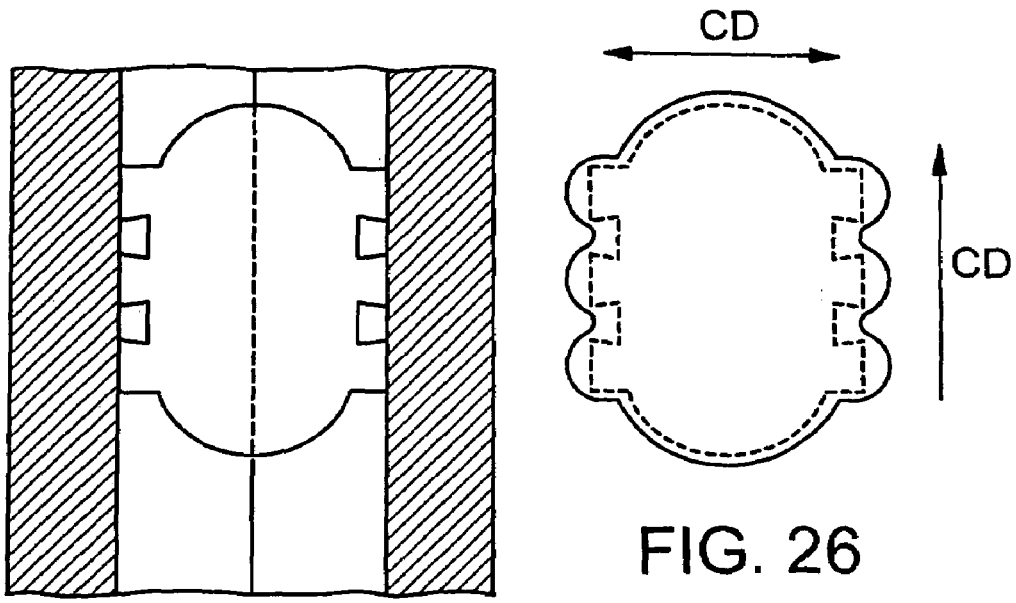
FIG. 26
FIG. 27
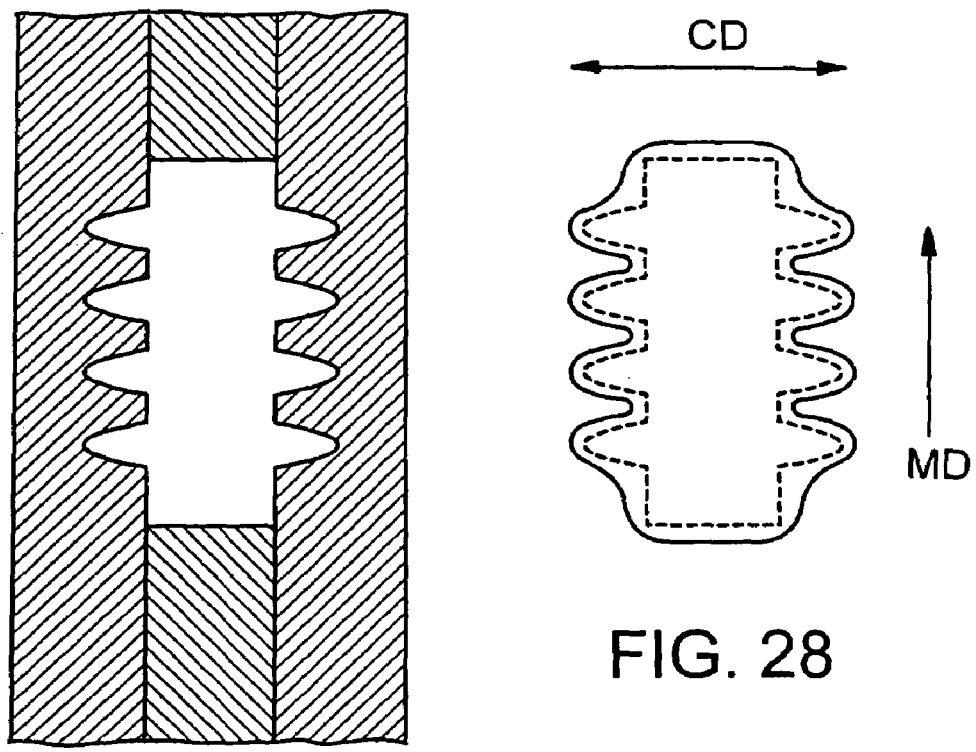
FIG. 28
FIG. 29

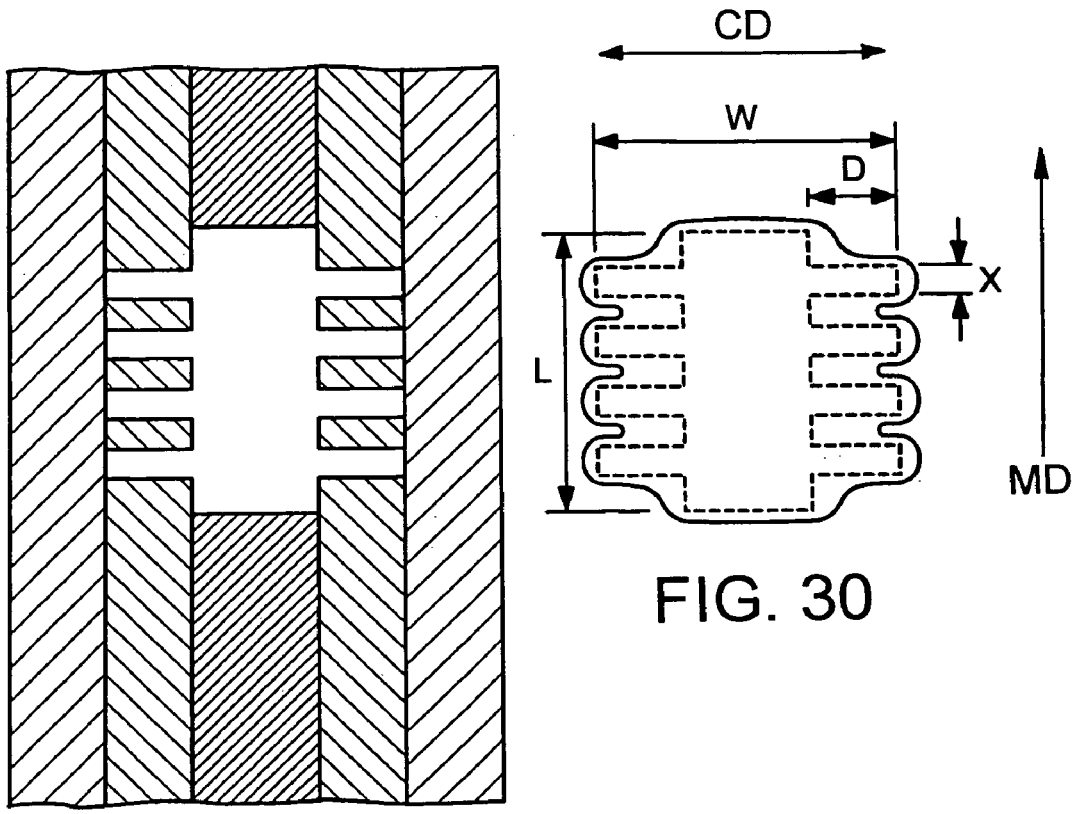
FIG. 30
FIG. 31
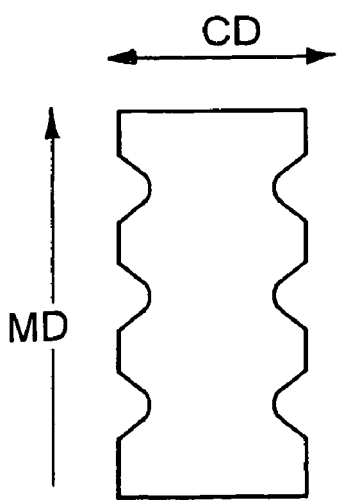
FIG. 32
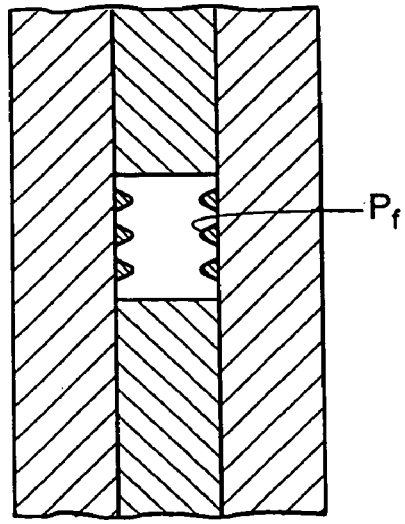
FIG. 33

TOUCH FASTENERS

CROSS REFERENCE TO RELATED APPLICATIONS

This application is a continuation-in-part, and claims benefit of priority from U.S. patent application Ser. No. 10/455,240, filed on Jun. 4, 2003, now U.S. Pat. No. 7,052,638 the contents of which is hereby incorporated by reference herein in its entirety.

TECHNICAL FIELD

This invention relates to male touch fastener components configured to releasably engage fibrous loops, and more particularly to fastener components with stems formed of molded resin.

BACKGROUND

Early male touch fastener products were generally woven materials, with hooks formed by cutting filament loops. More recently, arrays of small touch fastener elements have been formed by molding the fastener elements, or at least the stems of the fastener elements, of resin.

In most applications, male fastener elements are designed to releasably engage with a mating female fastener component carrying a field of loops or fibers. To engage the loops, the male fastener elements must penetrate into the field of fibers at least until the tips of the engaging fastener element heads have sufficiently extended beyond some of the fibers, such that the fibers can be engaged by the heads.

It is often difficult to manufacture male fastener components which strongly engage mating female fastener components when the female fastener components are characterized by a sparse pile and/or a low pile height. Furthermore, it is often difficult to manufacture male fastener components that have a gentle 'feel' against the skin, and at the same time provide strong engagement to a mating female fastener component.

SUMMARY

In general, the invention relates to molded male touch fastener components, and methods of making such components in which the touch fasteners include multiple, discrete engaging features that extend from an upper end of a formation, for engagement of loops. In some embodiments, the features are formed from projections that extend from a top surface, and/or a side of a stem. Some embodiments include flat upper surfaces and serrated edges.

In one aspect, the invention features a method of forming a touch fastener product. The method includes forming a pre-form product that includes a sheet-form base, and an array of formations integrally molded with and extending upward from the sheet-form base. Each formation includes a stem extending upward from the sheet-form base, and multiple, discrete, molded projections extending from the stem. The molded projections are deformed under downward pressure to form multiple corresponding, discrete features that extend laterally from a common side of an upper end of the formation. As deformed, the discrete features can, for example, engage a loop material, e.g., a sparse pile and/or a low pile height loop material.

In some embodiments, the multiple, discrete, molded projections of each formation extend from a top surface of the stem. In certain implementations, the multiple, discrete, molded projections extend upwardly from the top surface of the stem without substantially overhanging the sheet-form base.

In some implementations, each of the projections of each formation has a substantially equivalent maximum height above the sheet-form base. In other implementations, at least one projection of each formation is higher than other projections above the sheet-form base. In other specific implementations, each projection of each formation has a substantially equal lateral dimension.

In specific embodiments, each formation has at least three projections. In some instances, the projections of each formation are in-line in a first direction. The projections can also be in-line in a second direction perpendicular to the first direction. Each formation can have, for example, two rows of projections in a single direction. In a particular embodiment, each formation has three projections in each row. In another specific embodiment, at least one of the projections in one of the rows is higher than other projections.

In specific implementations, each projection of each formation is rectangular in transverse cross-section, and/or each stem of each formation is rectangular in transverse cross-section below a top surface of the stem. Each projection of each formation can, for example, taper from the top surface of the stem to a narrow distal extremity. A projection of a formation can be angled with respect the sheet-form base, and/or angled with respect to at least one side surface of the stem.

In some embodiments, the multiple, discrete, molded projections of each formation extend from at least one side surface of the stem. In other embodiments, the multiple, discrete, molded projections of each formation extend from all sides, and a top surface of the stem.

In some implementations, the deforming is performed by a heated roll that is substantially devoid of macroscopic texture so that a flat surface results. In specific implementations, heating is performed by a non-contact heat source, and deforming is performed by a chilled roll, e.g., a smooth chilled roll.

In another aspect, the invention features a touch fastener pre-form component. The pre-form component includes a sheet-form base and an array of formations integrally molded with and extending upward from the sheet-form base. Each formation includes a stem extending upward from the sheet-form base, and multiple, discrete, molded projections extending from the stem. The projections spaced apart and arranged to form multiple corresponding, discrete features extending laterally from a common side of an upper end of each formation for engagement of loops, upon vertical deformation of the molded projections under downward pressure to form a fastener element.

In some embodiments, the multiple, discrete, molded projections of each formation extend upwardly from a top surface of the stem.

In preferred embodiments, a density of the discrete, molded projections extending from the stem is from about 1,000 to about 20,000 projections per square inch (155-3,100 projections per square centimeter), e.g., from about 3,000 to about 12,000 projections per square inch (465-1,860 projections per square centimeter).

In specific embodiments, the multiple, discrete, molded projections extend upwardly from the top surface of the stem without substantially overhanging the sheet-form base. Each of the projections of each formation can have a substantially equivalent maximum height above the sheet-form base.

In specific implementations, each formation has at least three projections, and/or at least one projection of each formation is higher than other projections above the sheet-form base, and/or each projection of each formation has a substantially equal lateral dimension and/or at least one projection of each formation has a substantially different lateral dimension than another projection.

In some embodiments, the projections of each formation are in-line in a first direction, and a spacing, measured center-to-center, between adjacent projections in the first direction is from about 0.002 inch to about 0.020 inch (0.0508 millimeter to about 0.508 millimeter). The projections can also be in-line also in a second direction perpendicular to the first direction. A spacing, measured center-to-center, between adjacent projections in the second direction, can be, for example, about 0.004 inch to about 0.026 inch (0.1016 millimeter to about 0.6604 millimeter). Each formation can have two rows of projections in a single direction and each formation can have three projections in each row. Lateral sides of each projection can be substantially parallel and each projection of each formation can be rectangular in transverse cross-section. Each stem of each formation can also be rectangular in transverse cross-section below a top surface of the stem.

In specific embodiments, each projection of each formation tapers from the top surface of the stem to a narrow distal extremity. Each projection of each formation can be angled with respect the sheet-form base.

In some embodiments, the multiple, discrete, molded projections of each formation extend from at least one side of the stem and from a top surface of the stem.

In another aspect, the invention features a touch fastener component. The touch fastener component includes a sheet-form base, and an array of fastener elements extending upward from the sheet-form base. Each fastener element includes a stem integrally molded with and extending upward from the base, and multiple, discrete, fastening prongs extending upward from the stem. Each prong includes a lower portion integrally molded with and extending upward from the stem, and an upper portion. The upper portion of multiple prongs of a single fastener element overhang a side of the lower portion of their fastener element in a common direction. The prongs can, for example, engage a loop material.

In preferred implementations, greater than fifty percent, e.g., seventy-five, or ninety percent, of a top surface of each of the multiple, discrete, fastening prongs of each fastener element lie substantially in a single plane that is parallel the sheet-form base.

The touch fastener component can have, for example, elements that include greater than five fastening prongs, e.g., six, eight, ten, twelve, twenty, or more prongs.

In preferred implementations, a density of the multiple, discrete, fastening prongs is from about 1,000 to about 20,000 projections per square inch (155-3,100 projections per square centimeter), e.g., from about 3,000 to about 12,000 projections per square inch (465-1,860 projections per square centimeter). A maximum thickness of the multiple, discrete, fastening prongs is from about 0.0005 inch to about 0.020 inch (0.0127 millimeter to about 0.508 millimeter), and a maximum overhang of the multiple, discrete, fastening prongs is from about 0.0005 inch to about 0.010 inch (0.0127 millimeter to about 0.254 millimeter).

In specific embodiments, the multiple, discrete, fastening prongs of each fastener element are in-line in a first direction and are in-line also in a second direction perpendicular to the first direction.

In other specific embodiments, each fastener element has two rows of projections in a single direction and each row has three projections.

In another aspect, the invention features a touch fastener component. The touch fastener component includes a sheet-form base and an array of fastener elements extending upward from the sheet-form base. Each fastener element includes a stem integrally molded with and extending upward from the base and a head overhanging multiple sides of the stem. The head has a substantially flat upper surface, and includes multiple, discrete serrations extending laterally from a common side of the head.

In some embodiments, greater than fifty percent, e.g., greater than seventy-five, or greater than ninety percent, of the top surface of each head lies substantially in a single plane that is parallel the sheet-form base.

In preferred embodiments, a density of the multiple, discrete serrations is from about 1,000 to about 20,000 projections per square inch (155-3,100 projections per square centimeter), e.g., from about 3,000 to about 12,000 projections per square inch (465-1,860 projections per square centimeter). A maximum thickness of the multiple, discrete serrations can be from about 0.0005 inch to about 0.020 inch (0.0127 millimeter to about 0.508). A maximum overhang of the multiple, discrete serrations can be from about 0.0005 inch to about 0.010 inch (0.0127 millimeter to about 0.254 millimeter).

Embodiments may have one or more of the following advantages. The male fastener components provide good peel and shear strength properties in a desired single direction or multiple directions. The male fastener components can be formed using techniques that require limited changeover in basic tooling, yet allow for adjustments to produce the desired fastener characteristics. Many embodiments can be made with relatively inexpensive tooling, and components can be formed at relatively high line speeds. In some embodiments, male fastener components are provided that have a particularly high density of engageable features, e.g., a density of greater than 2,000 features/$in^2$ (310 features/$cm^2$) or more, e.g., 5,000, 10,000, or 20,000 features/$in^2$ (775, 1,550, 3,100 features/cm 2). A high density of engageable features allows for a strong engagement with a sparse pile. Many male fastener embodiments, especially those characterized by flat upper surfaces that enable a particularly close approach of fastener elements and loops, strongly engage loop material characterized as having a relatively sparse pile and/or a low pile height. An example of such a loop material is a non-woven loop material, e.g., that is used in many low cost products, e.g., mid- and lowest-cost disposable diapers and sanitary products. Many male fastener embodiments, especially those characterized by flat upper surfaces provide a soft, gentle feel to a touch of the human hand, preventing discomfort to the wearer.

All publications, patent applications, patents, and other references mentioned herein are incorporated by reference in their entirety.

Other features and advantages of the invention will be apparent from the following detailed description, and from the claims.

DESCRIPTION OF DRAWINGS

FIG. 2A is a top view of the preform shown in FIG. 2.

FIG. 2B is a top view of a portion of a touch fastener formed from arraying a plurality the formations shown in FIG. 2A.

FIG. 2C is a side view of the formation illustrated in FIG. 2.

FIG. 3A is a top view of a portion of a touch fastener formed from arraying a plurality of the individual fastener elements illustrated in FIG. 3.

FIGS. 3B and 3C are, respectively, cross-sectional and top views of a single, discrete fastening prong.

FIG. 3D is a side view of the formation shown in FIG. 3.

FIGS. 26 and 27 are, respectively, a top view of an individual fastener formation with serrated edges and a flat upper surface, and a top view of tooling for making its preform.

FIGS. 28 and 29 are, respectively, a top view of an individual fastener formation with serrated edges and a flat upper surface, and a top view of tooling for making its preform.

FIGS. 30 and 31 are, respectively, a top view of an individual fastener formation with serrated edges and a flat upper surface, and a top view of tooling for making its preform.

FIGS. 32 and 33 are, respectively, a top view of an individual fastener formation with serrated edges and a flat upper surface, and a top view of tooling for making its preform.

Like reference symbols in the various drawings indicate like elements.

DETAILED DESCRIPTION

Figures 1, 2:
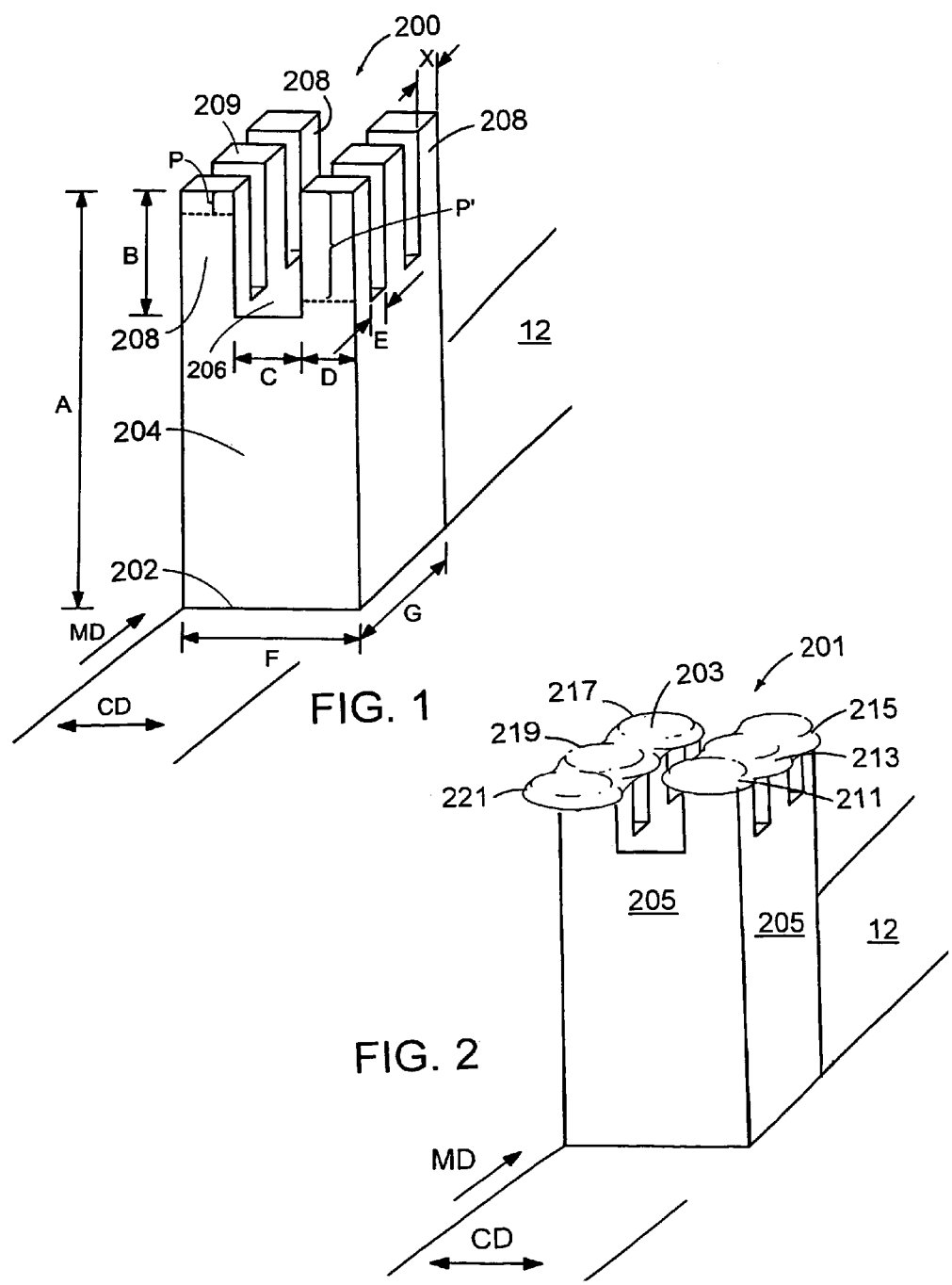
FIG. 1 is a highly enlarged perspective view of a castellated preform molded integrally with a base layer.
FIG. 2 is a perspective view of an individual fastener formation with serrated edges and a flat upper surface.

Referring to FIG. 1, straight-sided fastener preform 200 of molded plastic resin extends upwardly from and is continuous with a plastic resin base layer 12. Preform 200 includes a stem base 202, a central solid stem portion 204, a stem top surface 206 and a plurality of parallel, upwardly directed, discrete projections 208 extending to respective terminal ends 209. The projections have no overhang of base 12, and all side surfaces of the stems and projections are parallel. There is a two-by three pattern of upwardly directed projections, with each projection having in transverse cross-section (parallel to the base) that is rectangular. On single preform 200, three projections are aligned in a first direction, e.g., a machine direction (MD), in each of two columns spaced apart in a second direction, e.g., a cross-machine direction (CD). The projections of each pair are spaced further apart in the second direction than they are spaced apart between the pairs in the first direction. Such monolithic preform shapes in which there is little or no overhang of the projections over the base, allow for relatively inexpensive tooling, e.g., made by machining, and can allow for relatively high line speeds because the tooling has little or no under-cuts.

In some embodiments, the multiple, discrete, molded projections of each formation extend upwardly from a top surface of a stem, e.g., as shown above. In other embodiments, the multiple, discrete, molded projections of each formation extend outwardly from sides of a stem, as will be described a little latter below. In still other embodiments, the multiple, discrete, molded projections of each formation extend both upwardly from the top surface of the stem, and outwardly from sides of the stem.

Referring to FIG. 2, a fastener element includes a stem integrally molded with and extending upward from base 12, and a head 201 overhanging multiple sides 205 of the stem. Head 201 has a substantially flat upper surface 203, and head 201 includes multiple, discrete serrations 211-215 and 217-221 extending laterally, e.g., in the cross-machine (CD) direction, from a common side of the head.

Preferably, greater than fifty percent of upper surface 203 lies substantially in a single plane that is parallel to base 12. In other embodiments, greater than seventy five percent, e.g., eighty, eighty five, or ninety percent, of upper surface 203 lies substantially in a single plane that is parallel to base 12. A flat upper surface allows for a particularly close approach of head 201 and loops. In addition, flat upper surfaces provide a fastener that provides a soft, gentle feel to a touch of the human hand, preventing discomfort to the wearer of such a fastener.

In addition to forming fastener products that have fastener elements that include discrete serrations, preform 200 can be used to form fastener elements that have discrete fastening prongs. By the application of appropriate heat and pressure to the terminal ends 209 of projections 208, the shape of loop-engaging heads can be selectably formed to a desired conformation depending upon the particular fastening environment and fastening characteristics required.

Figure 3:
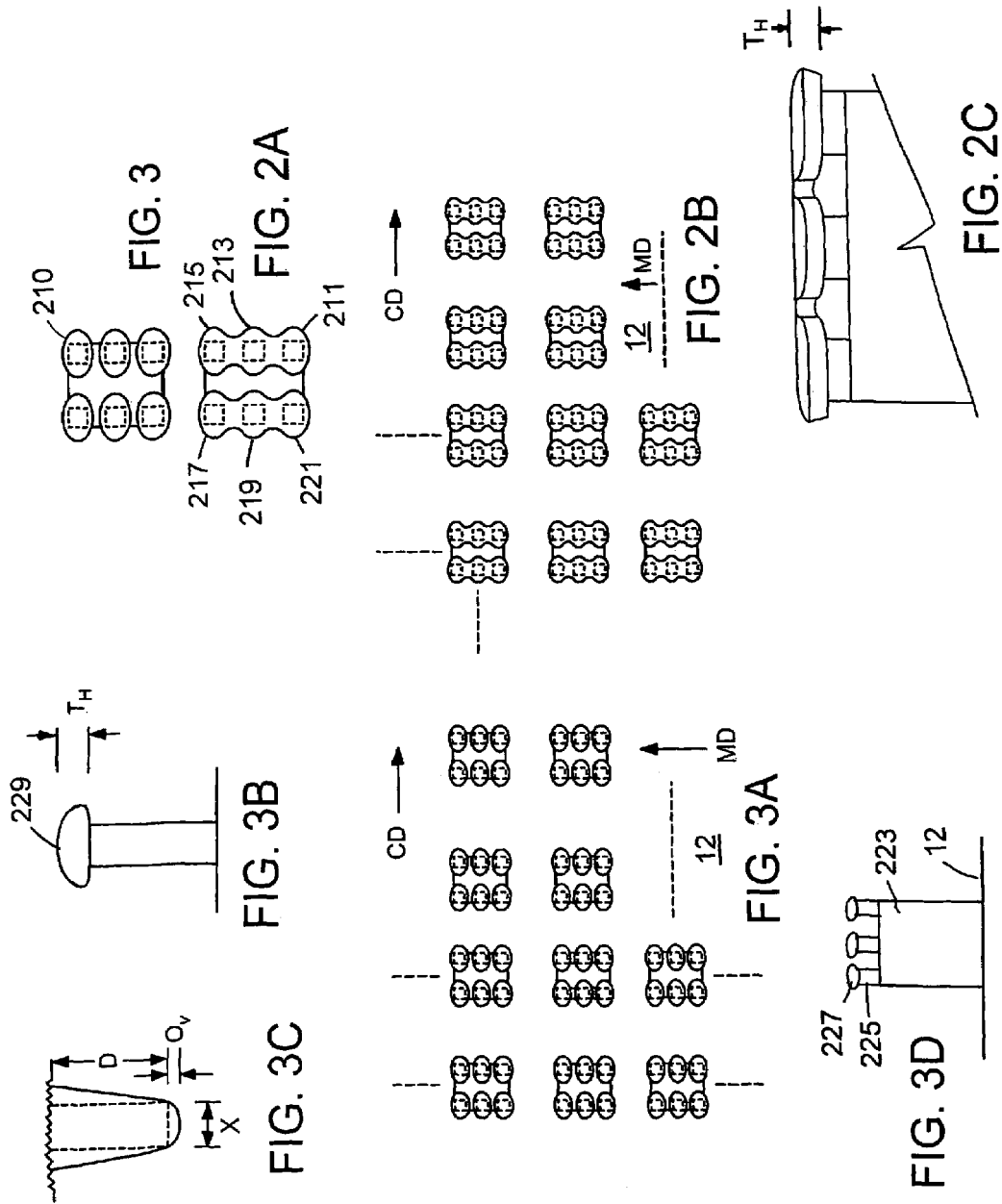
FIG. 3 is a top view of an individual fastener element that includes six discrete fastening prongs.

Referring particularly to FIGS. 3 and 3D, each fastener element includes a stem 223 integrally molded with and extending upward from base 12, and multiple, discrete, fastening prongs 210 extending upward from the stem. Each prong includes a lower portion 225 integrally molded with and extending upward from the stem, and an upper portion 227. The upper portion of multiple prongs of a single fastener element overhang a side of the lower portion of their fastener element in a common direction.

Referring particularly to FIG. 3B, preferably, each prong has a flat upper surface 229 to allow for a particularly close approach of each engaging prong and loops. In some embodiments, greater than fifty percent of a top surface of each of the fastening prongs of each fastener element lie substantially in a single plane that is parallel the sheet-form base. In some implementations, greater than seventy five percent, e.g., eighty, eighty-five, or ninety percent, of upper surfaces 229 lie substantially in a single plane that is parallel to base 12.

Figure 4:
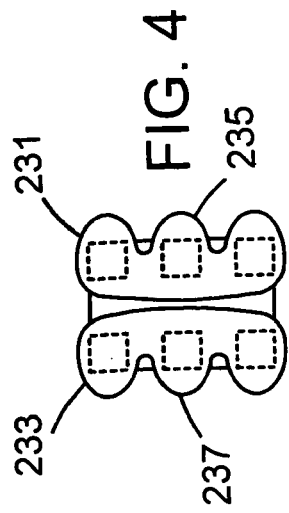
FIGS. 4 and 5 are top views of individual fastener formations with serrated edges and flat upper surfaces.
Figure 4A:
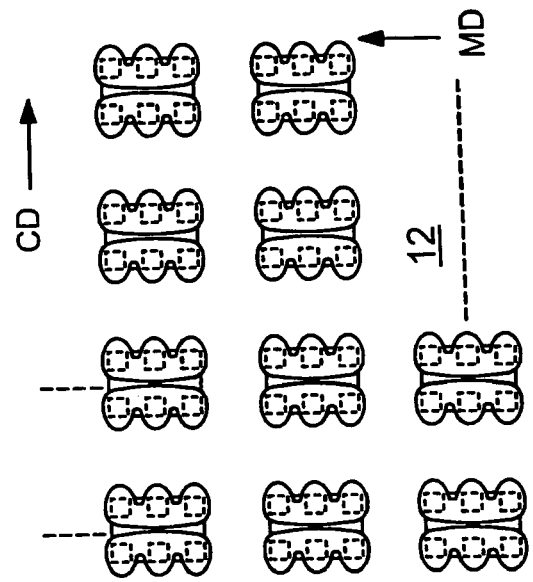
FIGS. 4A and 5A are top views of a portion of a touch fastener formed from the formations shown in FIGS. 4 and 5, respectively.
Figure 5:
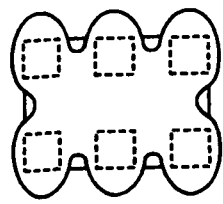
Figure 5A:
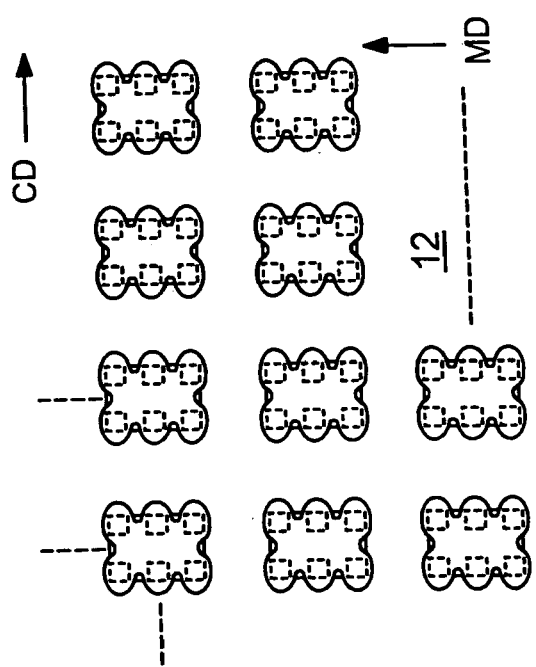

In the embodiment of FIG. 4, sufficient heat and pressure has been applied to produce two coalesced serrated head portions 231, 233, each having three fiber-engaging knob-like features 235, 237. In the embodiment of FIG. 5, further heat and pressure is effective to coalesce the all projections into a serrated, six-lobed head.

A large array of each of these fastener elements creates a sheet-form fastener product such as those shown in FIGS. 2B, 3A, 4A and 5A. In the arrays shown, individual fastener elements are aligned in XY coordinates. For certain applications it is desirable instead to employ a staggered array, or a random array.

Figure 6:
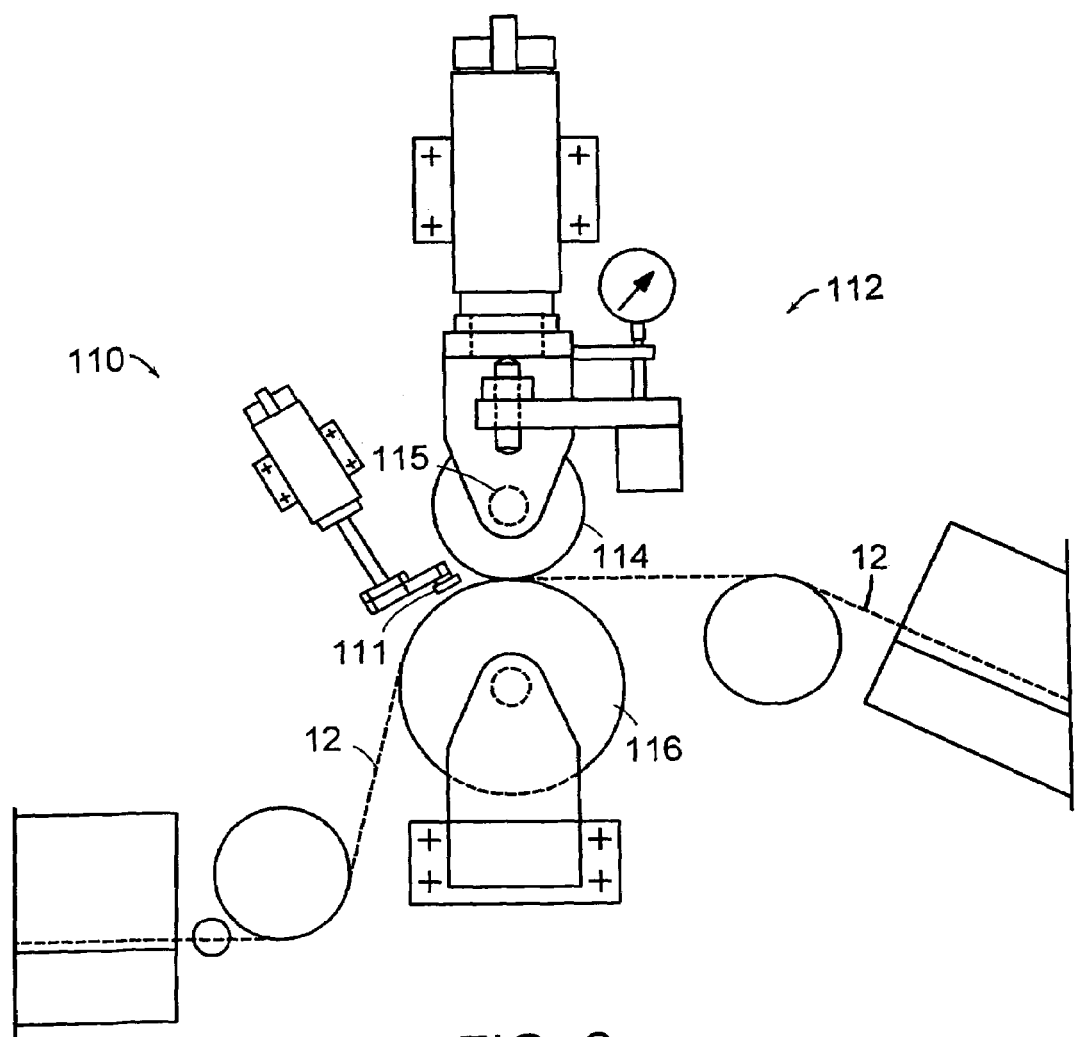
FIG. 6 is a side view of a portion of an apparatus for forming engageable features on a preform sheet material.

Referring to FIG. 6, the sheet-form fasteners shown in FIGS. 2B, 3A, 4A and 5A are formed by delivering a preform sheet that includes formations extending upward from sheet-form base 12 to a heating device 110, which heats the stems and projections. If only a small portion P (see FIG. 2) of the projections are heated by heating device 110, structures like that shown in FIG. 3 result, in which heads include multiple, discrete fastening prongs. Heating a larger portion P' of the projections, leads to coalescing of the discrete fastening prongs, as shown in FIG. 2, and in FIGS. 4 and 5. Portion P (or P') is heated to a softening temperature, typically a temperature that is greater than or equal to the VICAT softening temperature of the thermoformable polymer, and then portion P (or P') can be formed into a desired head shape. The remainder of the stem is not heated, and remains at a temperature that is less than the softening temperature, preferably at least ten percent less.

To ensure that only portion P (or P') is heated to the softening temperature, it is preferred that heating device 110 include a non-contact heat source 111 that is capable of quickly elevating the temperature of material that is very close to the heat source, without raising the temperature of material that is relatively further away from the heat source. Suitable non-contact heat sources include flame heaters, electrically heated nichrome wire, and radiant heater blocks. To heat portion P (or P') to the softening temperature without contact, the heat source typically must be at a relatively high temperature. For example, if the softening temperature is from about 100° C. to 140° C., the temperature of the heat source will generally be from about 300° C. to 1000° C., and the heat source will be positioned from about 0.1 to 50 mm from terminal ends of the projections.

After portion P (or P') has been heated, base 12 moves to conformation station 112, at which time base 12 passes between conformation roll 114 and drive roll 116. Conformation roll 114 forms portion P (or P') of the projections into a desired head shape, while drive roll 116 advances base 12 and flattens it against roll 114 to enhance head uniformity. It is preferred that the temperature of conformation roll 114 (the forming temperature) be lower than the softening temperature. Maintaining the conformation roll 114 at this relatively low temperature has been found to allow the conformation roll to flatten into a desired head shape the spherical ("ball-shaped") tips of the projections that are generally formed during the previous heating step. A low forming temperature also prevents adhesion of the thermoformable polymer to the conformation roll. Generally, to obtain the desired forming temperature it is necessary to chill the conformation roll, e.g., by running cold water through a channel 115 in the center of the roll, to counteract heating of the conformation roll by the heat from portion P (or P') of the projections. If further cooling is needed to obtain the desired forming temperature, the drive roll may be chilled in a similar manner.

In a preferred embodiment, conformation roll 114 is a smooth cylindrical roll, so that upon deformation of the molded projections under downward pressure to form multiple corresponding, discrete features, a substantially flat upper surface is formed. A flat surface allows for a particularly close approach of heads and loops.

The spacing of the conformation roll 114 from the drive roll 116 is selected to deform portion P (or P') to form the desired head shape, without excessive damage to the unheated portion of the stems. It is preferred that the spacing be sufficiently small so that the drive roll flattens base 12 and provides substantially uniform contact pressure of terminal ends of the projections against the conformation roll. Relatively low pressures generate fasteners where the prongs are only partly deformed (see, for example, FIG. 3), while relatively high pressures generate fasteners in which the projections are more fully deformed (see, for example, FIG. 5).

Figure 7:
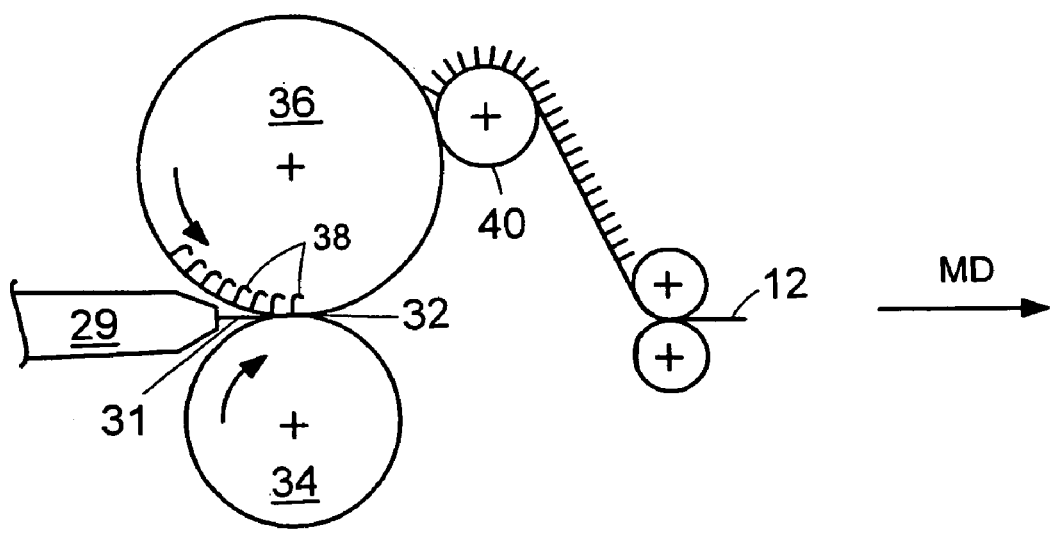
FIGS. 7 and 8 illustrate two machines for molding sheets of touch fastener preforms.

In a preferred embodiment, a preform sheet that includes formations extending upward from sheet-form base 12 can be formed by an apparatus illustrated in FIG. 7. Thermoplastic resin 31 from extruder 29 is introduced into nip 32 formed between a supporting pressure roll 34 and a mold roll 36. Pressure in the nip causes thermoplastic resin 31 to enter blind-ended formation forming cavities 38 of mold roll 36 while excess resin remains about the periphery of the mold roll and is effectively calendared to form base sheet 12. As the rolls 34, 36 rotate in opposite directions (shown by arrows), the thermoplastic resin proceeds along the periphery of the mold roll until it is stripped by stripper roll 40. The direction of travel of the material illustrated in FIG. 7 is referred to as the "machine direction" (MD) of the material and defines the longitudinal direction of the resulting preform sheet product.

In preferred cases, the mold roll comprises a face-to-face assemblage of circular plates or rings, some having cutouts in their periphery defining mold cavities and others being circular, serving to close the open sides of the mold cavities and serve as spacers.

Figure 8:
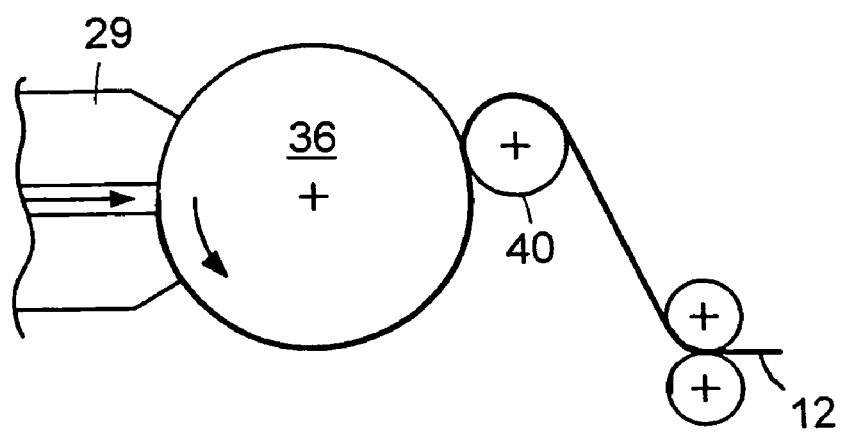

In another embodiment, illustrated in FIG. 8, an alternate technique for producing preform sheet product is employed. The process is similar to that described above with reference to FIG. 7, except only a mold roll is used, i.e., no pressure roll is necessary. Here, the extruder head 29 is shaped to conform to the periphery of the mold roll and the extruded resin is introduced directly to a gap formed between the mold roll and the extruder head.

Figure 9:
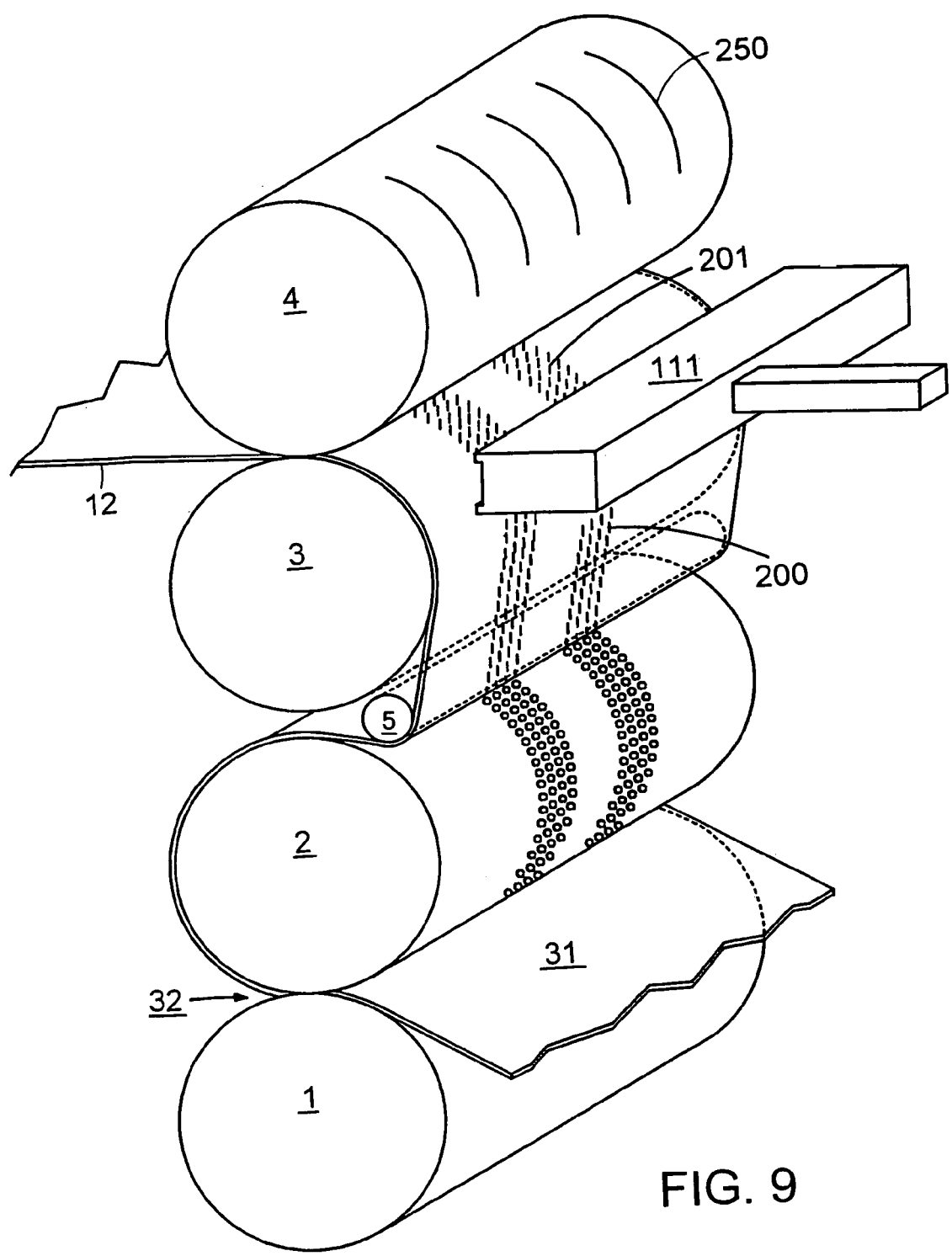
FIG. 9 is a perspective view of a preferred apparatus for forming engageable features on a preform sheet material.

The presently preferred method for forming fastener product combines the process shown in FIG. 7 with that shown in FIG. 6. Referring to FIG. 9, the presently preferred continuous molding/forming process includes an extruder 29 that provides a molten resin strip 31 to a roll stack that includes rolls 1, 2, 3 and 4. The plastic passes through the nip 32 between rolls 1 and 2. Roll 2 is a mold roll, and its exposed outer surface include mold cavities such that the molten polymer flowing into the cavities takes on the form of the cavity. An array of formations integral with a backing sheet 12, is molded by roll 2, and the formations are demolded about a take-off roller 5 in making the transition to roll 3. On roll 3, terminal ends of formations pass under a non-contact heat source as a first step to create heads.

In this embodiment, the non-contact heat source is a close-lying gas burner 111, and the sides as well as terminal ends of the formations are immersed in the hot gases produced by the burner. Thus, the sides are rapidly heated by convective effects, as are the terminal end portions, which also receive radiative heating. The heated formations pass between another nip created between rolls 3 and 4, in which roll 4 presses down upon the molten polymer of the terminal end portions and forms a desired head shape.

Preferably, the forming roll 4 is cooled, to remain at a temperature below the molten polymer temperature, preferably considerably lower. In addition, preferably the conformation roll is a smooth cylindrical roll, so that upon deformation of the molded projections under downward pressure to form multiple corresponding, discrete features, a substantially flat upper surface is formed to allow for a particularly close approach of heads and loops.

With the surface of roll 4 cooled to temperature below the condensation temperature of steam, and in the case of use of flame from a burner to heat the stems in close proximity to a cooled conformation roll 4, water 250 as a combustion product from the burning gas fuel condenses on the roll 4 and is found to act as a release agent for promoting clean separation of the formed heads and the surface of the roll as the headed hooks exit from under the forming roll. Best advantage is obtained by locating the point of heating close to the rolls 3 and 4. In preferred embodiments the tip of heat source 111 is within one centimeter of roll 3 and within 2.5 centimeters of roll 4.

The air gas mixture of the gaseous fuel and air is introduced to the burner in substantially stoichiometric ratio for optimum combustion, such that substantially complete combustion occurs, producing byproducts essentially only of carbon dioxide and water.

The burner may have a ribbon opening extending across the width of the web, or may comprise jet holes, the spacing between holes being closer than the distance to the heads such that because of air entrainment a substantially uniform turbulent stream of hot gas reaches the top portion of the features to be melted.

In one preferred embodiment a ribbon burner is used, providing a continuous line of flame. The burner temperature is between about 1000° and 1200° C., produced with a natural gas feed, the primary component of which is methane ($CH_4$).

The burner face is approximately 1" wide (25.4 mm). The web travels at speeds in the range of 20 to 200 ft/min (6.1-61.0 m/min), and so a formation spends only a fraction of a second under the burner. In this amount of time a sufficient amount of heat is transferred into the formations to enable head formation. Heat is transferred to the formations by forced convection, with the heat being transferred to terminal ends of the projections, as well as between the projections.

In some cases the line speed is dependent upon the amount of heat desired to be transferred to a particular group of formations.

While the presently preferred method for forming a fastener product has been described above, in some embodiments, deforming formations to form heads is performed by a heated mold roll that is devoid of macroscopic texture so that a substantially flat upper surface results.

Referring back again to FIG. 1, dimension A represents an overall height of the preform, B a projection height, C a spacing between projections in the cross-machine direction, D a projection thickness in the cross-machine direction, E a spacing between projections in the machine direction, X a projection thickness in the machine direction, F a width of the preform stem in the cross machine direction, and G a thickness of the preform stem in the machine direction. The dimensions preferably range as follows:

|  | General Range | Preferred Range | Most Preferred for Personal Care Products and the like |
|---|---|---|---|
| A = | 0.007 to 0.080 inch | 0.010 to 0.040 inch | 0.013 to 0.030 inch |
| B = | 0.0014 to 0.080 inch | 0.002 to 0.040 inch | 0.003 to 0.010 inch |
| C = | 0.002 to 0.012 inch | 0.002 to 0.010 inch | 0.002 to 0.006 inch |
| D = | 0.002 to 0.020 inch | 0.002 to 0.008 inch | 0.002 to 0.004 inch |
| E = | 0.002 to 0.010 inch | 0.002 to 0.008 inch | 0.002 to 0.004 inch |
| F = | 0.002 to 0.020 inch | 0.002 to 0.012 inch | 0.003 to 0.012 inch |
| G = | 0.002 to 0.020 inch | 0.002 to 0.012 inch | 0.003 to 0.012 inch |
| X = | 0.001 to 0.010 inch | 0.001 to 0.004 inch | 0.001 to 0.004 inch |

FIG. 3C is a plan view of a discrete fastening prong, while FIG. 3B is a cross-sectional view of the prong. Overrhang $O_v$ preferably ranges from about three-tenths to about seven-tenths of prong width (X), and thickness $T_h$ preferably ranges from about five-tenths to about thirteen-tenths of prong width (X). Preferably, X is from about 0.001 (0.025 mm) to about 0.010 inch (0.25 mm). More preferably, X is less than about 0.008 inch (0.20 mm), and ranges from about 0.001 inch (0.025 mm) to about 0.004 inch (0.10 mm). For rectangular transverse cross-sections, such as that shown in FIG. 1, a density of the discrete fastening prongs may advantageously range from 1,000-20,000 prongs/$in^2$ (155-3,100 prongs/$cm^2$).

Figure 10:
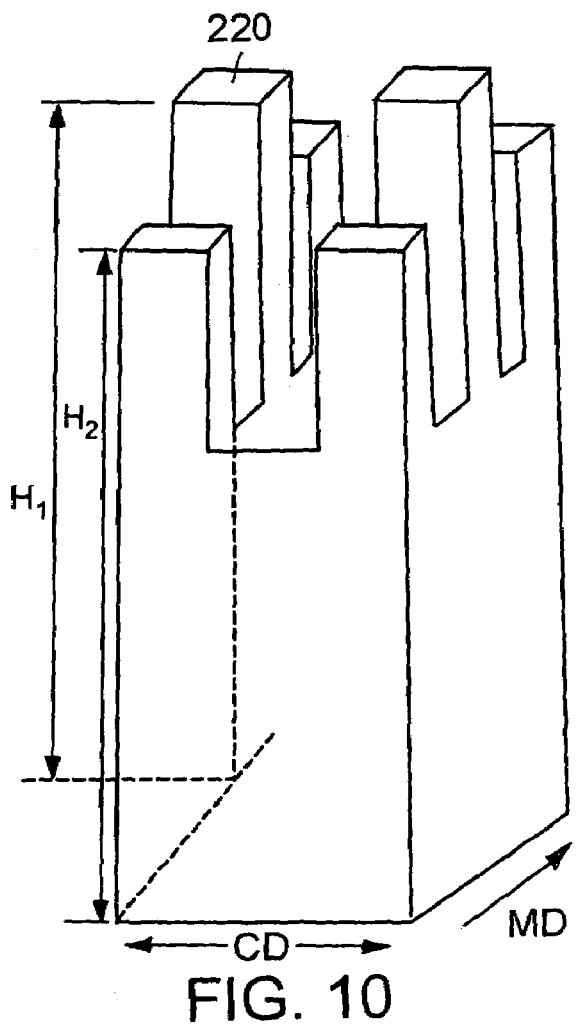
FIG. 10 is a highly enlarged perspective view of a castellated preform having molded projections of different heights.
Figure 11:
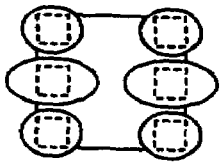
FIG. 11 is a top view of an individual fastener formation that includes six discrete fastening prongs.
Figure 12:
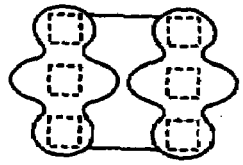
FIGS. 12-14 are top views of individual fastener formations that include serrated edges.
Figure 13:
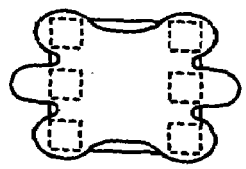
Figure 14:
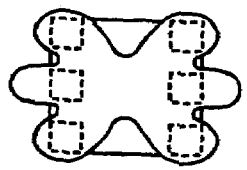

Referring now to FIG. 10, a castellated preform with six straight, vertical-sided projections is shown. A central prong 220 in each machine direction row is taller than its machine direction neighbors at each side. In one example, height $H_2$ is about 0.025 inch (0.635 mm) and height $H_1$ is about 0.030 inch (0.762 mm).

Referring to FIGS. 11-14, the taller projections provide more material for melting down, resulting in larger head formations. This has a desirable omni-directional effect, enabling a fastener to have loop-engaging ability regardless of the direction of relative shear movement between a touch fastener component and a matching loop surface.

Figure 15:
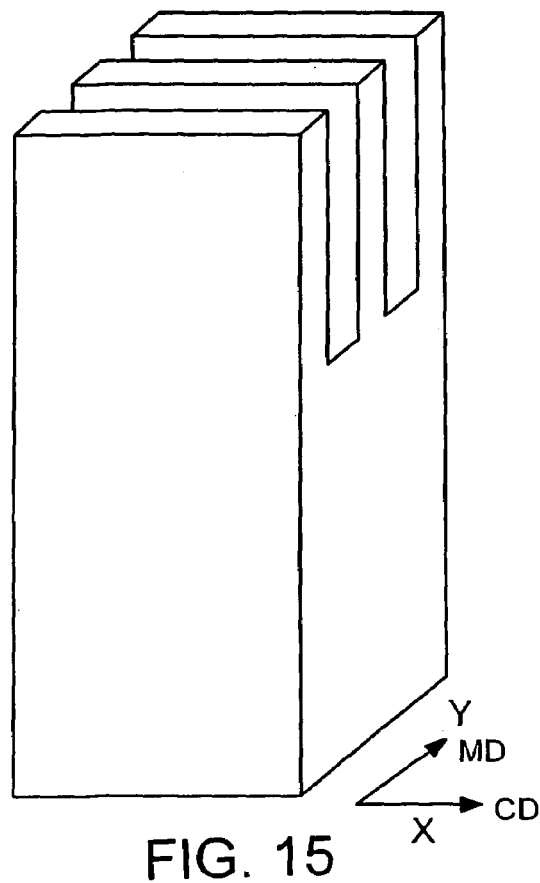
FIG. 15 is a highly enlarged perspective view of preform that includes three projections.
Figure 16:
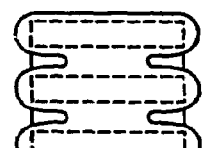
FIGS. 16-18 are top views of individual fastener formations that include serrated edges.
Figure 17:
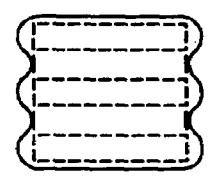
Figure 18:
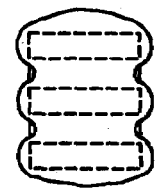

Referring to FIGS. 15-18, a three-projection preform is shown along with serrated fastener heads made from the preform of FIG. 15. This particular embodiment has projections that are sturdier in X, e.g., cross-machine direction, and provide more material for deformation.

Figure 19:
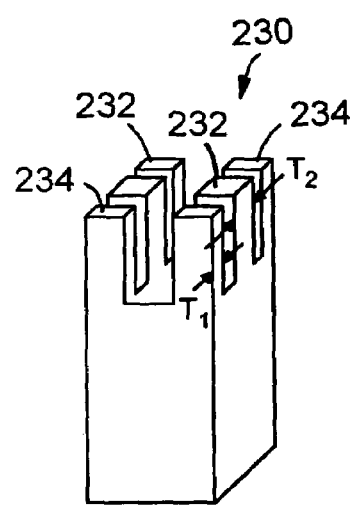
FIG. 19 is a highly enlarged perspective view of a castellated preform that includes six projections, and illustrates projections of different dimensions.
Figure 20:
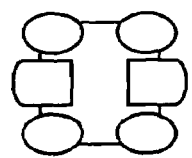
FIG. 20 is a top view of an individual fastener formation that includes six discrete fastening prongs.

Referring to FIG. 19, a castellated preform 230 has six projections extending upwardly from a top surface of a stem. In this case, middle projections 232 have a greater thickness than neighboring projections 234 on either side. For example, thickness $T_2$ of the thicker projections 232 may range between about 0.003 inch to about 0.008 inch (0.076-0.203 mm), while thickness $T_1$ of the thinner projections 234 range from about 0.001 inch to about 0.004 inch (0.025-0.102 mm). This feature enables forming a range of different head sizes, for example, as shown in FIG. 20, to enable engagement of different loop sizes.

Figure 21:
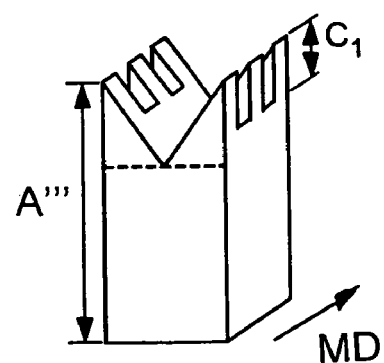
FIGS. 21 and 22 are perspective views of straight-sided M-style preforms that include six projections extending from a top surface.
Figure 22:
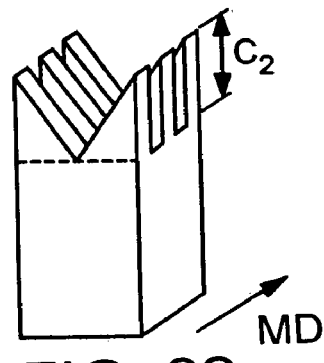

FIGS. 21 and 22 show preforms that include six projections per preform. The depth of the open spaces between the projections is shown greater in FIG. 22 than in FIG. 21. The relatively small projections enable forming small discrete features extending laterally from a common side of an upper end of the formation. Such preforms can be used, for example, when it is desired to have better cross-direction engagement. Referring particularly to FIG. 21, in a specific embodiment, overall height A''' is about 0.025 inch and cutout height $C_1$ is about 0.005 inch (0.127 mm). Referring particularly to FIG. 22, in a specific embodiment, cutout height $C_2$ is about 0.009 inch (0.229 mm).

Fasteners described above have been made from preforms that include projections that extend from a top surface of the stem of the preform. In certain instances, projections may extend upwardly from a top surface and/or outwardly from a side surface of the stem.

Figure 23:
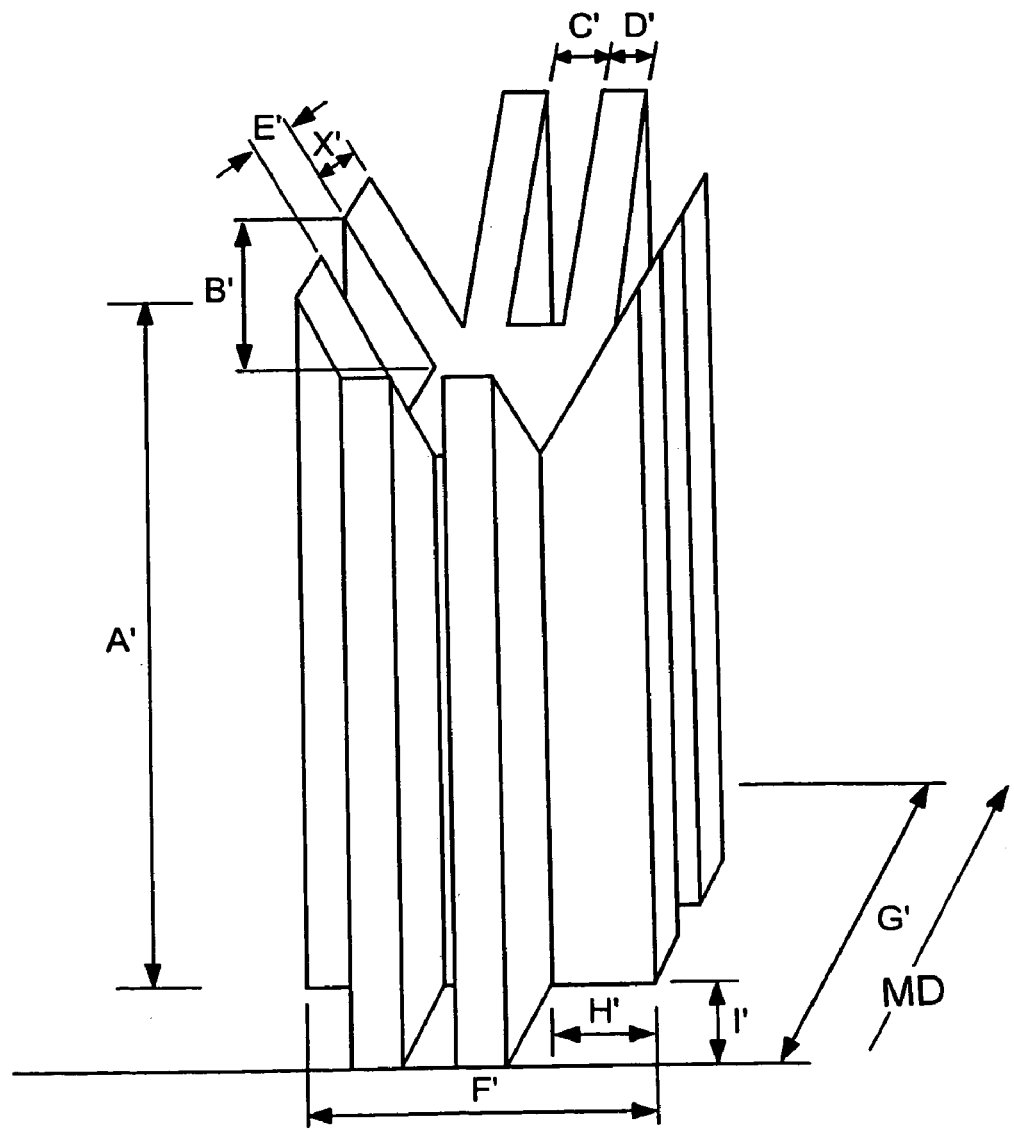
FIG. 23 is a perspective view of a preform that includes eight molded projections that extend from a top surface and from sides of a stem.

Referring particularly to FIG. 23, an eight-projection preform is shown in which projections extend upwardly from a top surface and outwardly from a side surface of a stem. The resultant loop engageable fastener can have a desirable, more complex edge, and can have more features per unit area, which can enable engagement with very small loops. The dimensions of the preform are preferably as follows:

|       | General Range      | Preferred Range    | Most Preferred     |
|-------|--------------------|--------------------|--------------------|
| A' =  | 0.007 to 0.080 inch | 0.010 to 0.040 inch | 0.013 to 0.030 inch |
| B' =  | 0.003 to 0.027 inch | 0.004 to 0.015 inch | 0.004 to 0.010 inch |
| C' =  | 0.002 to 0.012 inch | 0.001 to 0.008 inch | 0.002 to 0.004 inch |
| D' =  | 0.001 to 0.020 inch | 0.002 to 0.008 inch | 0.001 to 0.004 inch |
| E' =  | 0.002 to 0.012 inch | 0.002 to 0.008 inch | 0.001 to 0.004 inch |
| F' =  | 0.007 to 0.030 inch | 0.007 to 0.022 inch | 0.007 to 0.016 inch |
| G' =  | 0.007 to 0.020 inch | 0.007 to 0.022 inch | 0.007 to 0.016 inch |
| X' =  | 0.001 to 0.010 inch | 0.001 to 0.008 inch | 0.001 to 0.004 inch |
| H' =  | 0.002 to 0.012 inch | 0.002 to 0.008 inch | 0.002 to 0.005 inch |
| I' =  | 0.002 to 0.012 inch | 0.002 to 0.008 inch | 0.002 to 0.005 inch |

Figure 25:
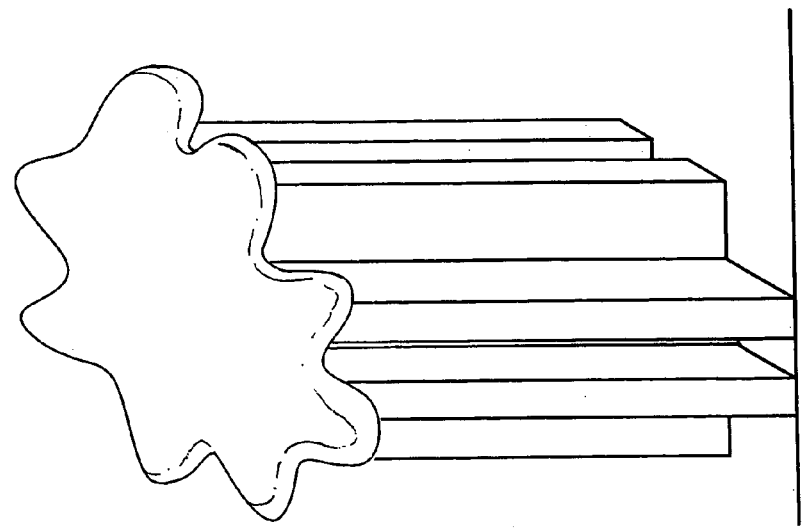
FIGS. 24 and 25 are, respectively, a perspective view of a preform that includes eight molded projections extending from sides of a stem, and a corresponding serrated fastener element with a flat upper surface.
Figure 24:
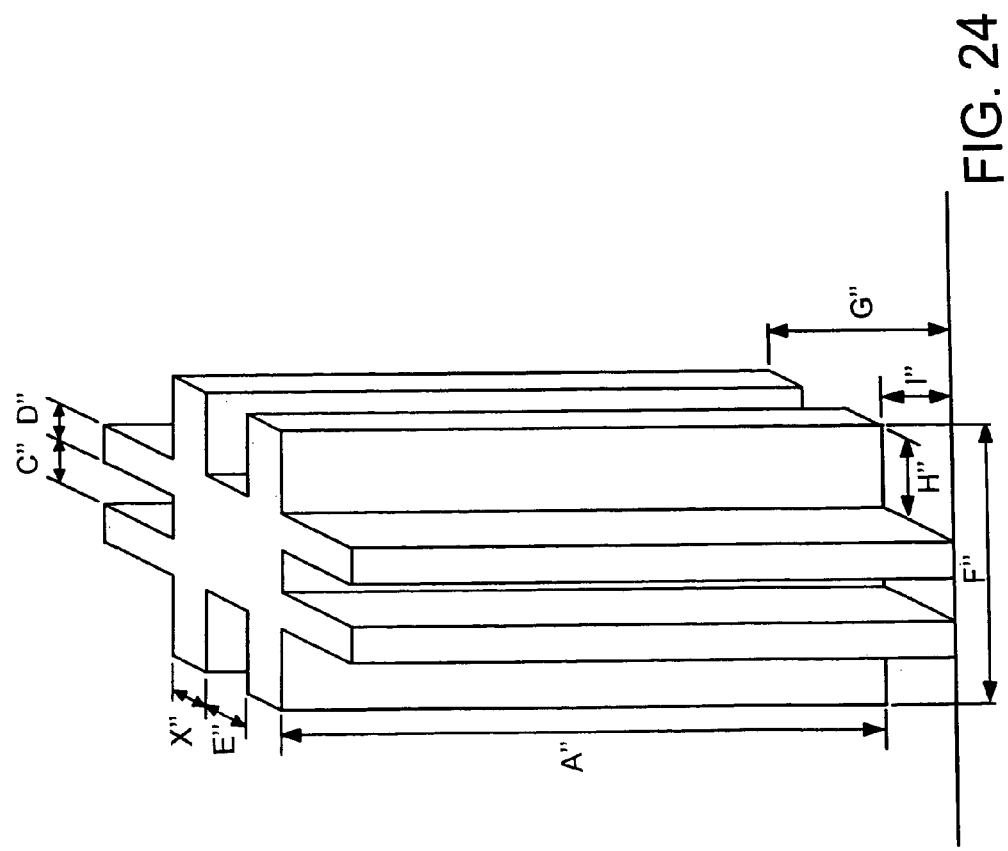
Figure 34:
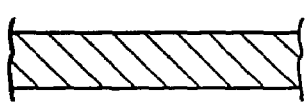
FIGS. 34-39 are a sequence of cross-sectional views, illustrating steps in making the tooling of FIG. 33.

FIG. 24 shows a preform similar to that shown in FIG. 23, except projections extend only from sides of a stem. Referring to FIG. 25, after deforming under pressure, a head overhangs multiple sides of the stem. The resulting head has a substantially flat upper surface, and includes multiple, discrete serrations extending laterally from a common side of the head. This enables formation of small engageable features, and enables more engageable elements per unit area. The density of engageable features for this particular embodiment ranges from about 4,000 to about 16,000 engageable features/in$^2$ (620-2,480 features/cm$^2$). Dimensions are preferably as follows:

|       | Preferred Range     | Most Preferred      |
|-------|---------------------|---------------------|
| A'' = | 0.010 to 0.040 inch | 0.013 to 0.030 inch |
| C'' = | 0.002 to 0.010 inch | 0.001 to 0.004 inch |
| D'' = | 0.002 to 0.008 inch | 0.001 to 0.003 inch |
| E'' = | 0.002 to 0.008 inch | 0.001 to 0.004 inch |
| F'' = | 0.007 to 0.022 inch | 0.007 to 0.016 inch |
| G'' = | 0.007 to 0.022 inch | 0.007 to 0.016 inch |
| X'' = | 0.001 to 0.008 inch | 0.001 to 0.004 inch |
| H'' = | 0.001 to 0.008 inch | 0.002 to 0.005 inch |
| I'' = | 0.001 to 0.008 inch | 0.002 to 0.005 inch |

FIGS. 26-33 show a variety of multi-projection preforms, corresponding multi-featured, serrated fastener elements after deformation, and tooling that can be used to form the preforms. All of these fasteners elements have small engaging heads that are particularly engaging in the cross-machine direction. Referring particularly to FIG. 30, in a specific embodiment, an overall dimension of the preform in the machine direction L is from about 0.009 inch to about 0.020 inch (0.229-0.508 mm). An overall dimension of the preform in the cross-machine direction W is from about 0.008 inch to about 0.016 inch (0.203-0.406 mm). X and D are generally as described above in reference to FIG. 1.

In some embodiments, tooling for making the preforms described above begins by using flat stock tool rings having simple cavities, for example, rectangular cavities, formed, e.g., by laser cutting through the thickness of the flat stock. Tool rings with a positive feature $P_f$ such as that shown in FIG. 33, are then placed face-to-face with these flat rings. The flat surfaces of the rings and flat tool rings lay face-to-face against one another, with the positive features $P_f$ of these rings extending into the cavities of the flat tool rings, as shown in FIG. 33.

Figure 35:
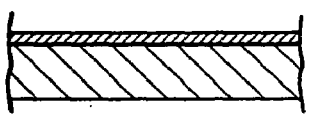
Figure 36:
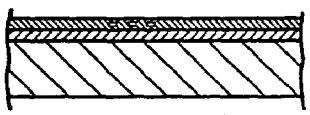
Figure 37:
Figure 38:
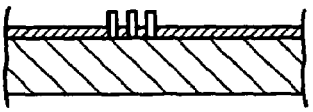
Figure 39:
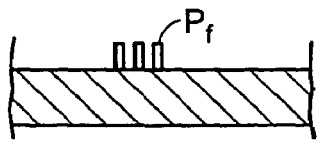

The features on the tool rings may be created by various techniques including electroplating, stamping, etching, milling, EDM, etc. The electroplating option is shown in FIGS. 34-39. A flat stock tool ring (FIG. 34) is first coated with a photoresist layer, as shown in FIG. 35. A mask is placed on the resist layer (FIG. 36), and the composite is exposed to UV light. Exposed areas of resist are then removed leaving the tool ring exposed in these areas, as shown in FIG. 37. Metal is then preferentially electroplated in these exposed areas, as shown in FIG. 38. The resist is then removed leaving the tool ring as seen in FIG. 39.

Figure 40:
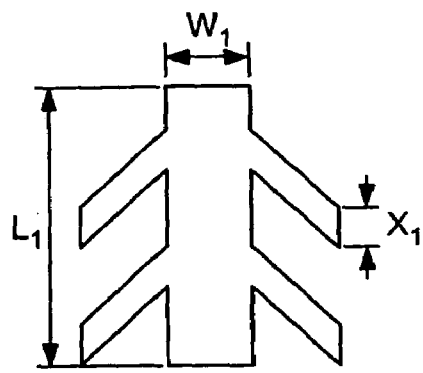
FIGS. 40 and 42 are top views of four-feature preforms, each preform having molded projections that are angled with respect to a stem from which they extend.
Figure 41:
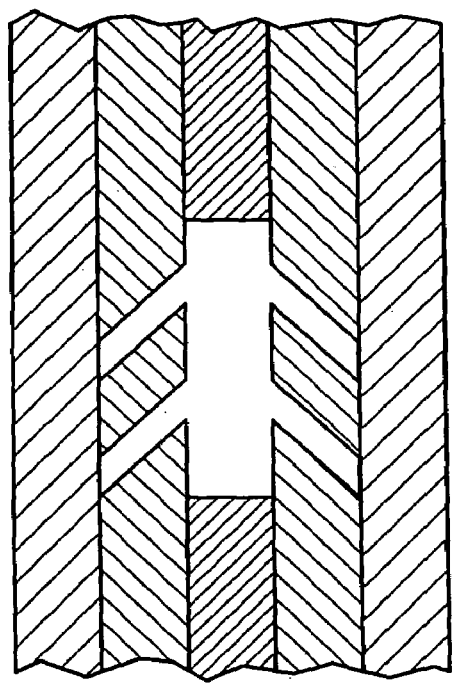
FIG. 41 is a top view of tooling for the preform of FIG. 40.
Figure 42:
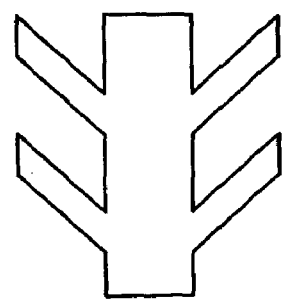
Figure 43:
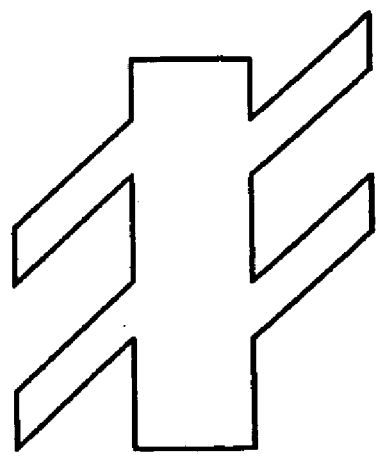
FIG. 43-45 are, respectively, top views of a four, five and six-feature fastener preform.
Figure 44:
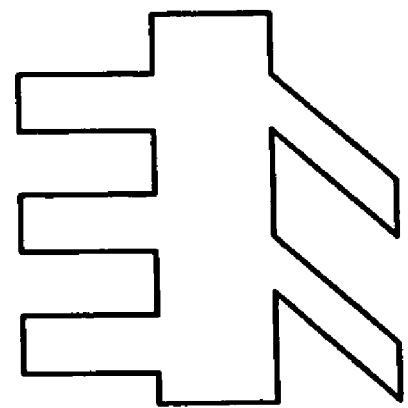
Figure 45:
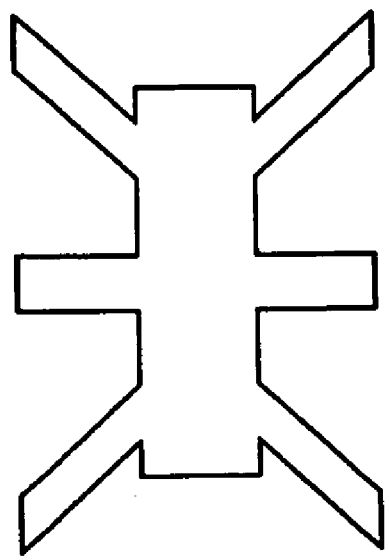

FIGS. 40, 42-45 are alternative, multi-projection preforms, while FIG. 41 illustrates tooling for the preform of FIG. 40. When the corresponding fasteners elements are formed from these preforms, the fasteners provide multi-directional engagement from a single stem. Referring particularly to FIG. 40, in specific embodiments, dimensions of $L_1$, $W_1$ and $X_1$ are from about 0.010 inch to about 0.020 inch (0.254-0.508 mm), about 0.004 inch to about 0.009 inch (0.102-0.229 mm), and about 0.001 inch to about 0.005 inch (0.025-0.127 mm), respectively.

Suitable materials for use in forming the fasteners are thermoplastic polymers that provide the mechanical properties that are desired for a particular application. Preferred polymers include polypropylenes, such as those available from Montell under the tradename MOPLEN, polyethylenes, ABS, polyamides, and polyesters (e.g., PET).

The touch fasteners described above are useful in nearly any application in which it is desirable to releasably engage a mating female fastener component carrying a field of loops or fibers. Discrete, individual engaging prong products (e.g., FIG. 3), and serrated head products (e.g., FIG. 2) are each useful under particular circumstances.

The touch fasteners can be particularly useful in applications in which the loop component is characterized as having a relatively sparse pile and/or a low pile height. In addition, the touch fasteners can also be particularly useful in applications when it is desirable to provide a soft, gentle feel to a touch of the human hand.

Specific products include personal care products and the like such as diapers, training pants, swim pants, sanitary napkins, panty liners, incontinency garments. Other specific products include containers for food storage, covers, filters, towels, paper towels, medical wraps, gowns, surgical drapes, facemasks, single patient use devices, packaging closures, and outdoor shelters.

The male fastener components can be formed using techniques that require limited changeover in basic tooling, yet allow for adjustments to produce the desired fastener characteristics.

Tooling for straight-sided preforms can be relatively inexpensive because no engageable heads or overhanging features need to machined into the tooling. Line speeds can be relatively high because the tooling has little or no under-cuts.

Spacing between the projections, e.g., that extend upwardly or outwardly from a stem enables good heat transfer. This allows for high production rates, and efficient use of capital equipment, space and manpower, enabling low cost production.

It is possible to have fastener products that have more engageable features per unit area to provide for a stronger, more efficient loop engagement. For example, in embodiments, a density of greater than 2,000 features/in$^2$ (310 features/cm$^2$), or more is possible, e.g., 3,000, 5,000, 7,500, 10,000, or 20,000 features/in$^2$ (465, 775, 1,163, 1,550, 3,100 features/cm$^2$).

Since each stem is relatively large, it provides for a good, sturdy support for small engaging features so that the features can engage a low pile loop material (e.g., a non-woven).

Relatively small engaging features increase the probability for penetration and engagement with small loops, when compared with large heads.

Initial "grab" or seize of a loop material by a fastener component can disturb a bed of loops and bring other loops into range to be engaged by proximate features. In other words, the initial engagement of a loop can break up loop interconnections and enable more loops to become exposed. Surprisingly, we have discovered, that for the fastener components described herein, "engagement breeds engagement." That is to say, that during engagement or during peeling action, the fasteners described, when engaging some loops, expose more loops for engagement by disrupting the loop pile, in a cascade-like effect.

Figure 46:
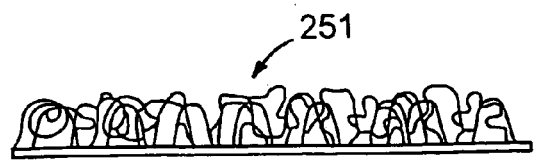
FIG. 46 is a highly enlarged, diagrammatic side view of a non-woven, low-pile loop material.
Figure 47:
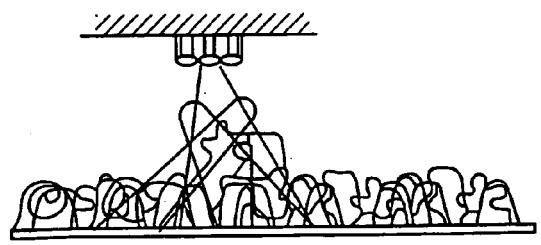
FIG. 47 is a highly enlarged diagrammatic side view of an individual fastener formation with serrated edges engaging a non-woven, low-pile loop material.
Figure 48:
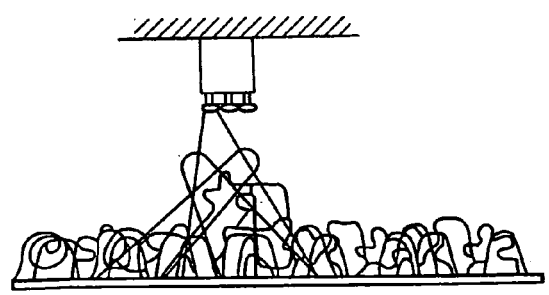
FIG. 48 is a highly enlarged diagrammatic side view of an individual fastener element with discrete fastening prongs engaging a non-woven, low-pile loop material.
Figure 49:
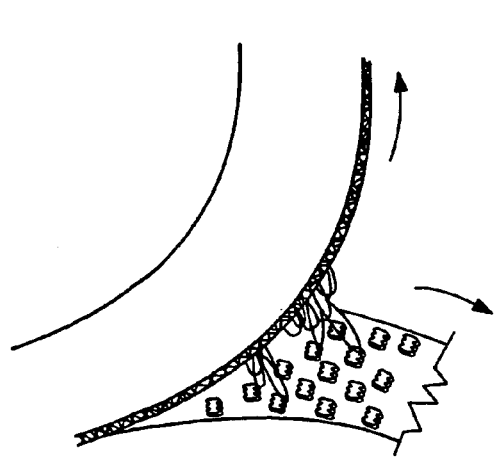
FIGS. 49 and 49A diagrammatically illustrate "engagement breeding engagement," using touch fasteners formed from the fastener formations illustrated in FIGS. 5 and 3, respectively.
Figure 49A:
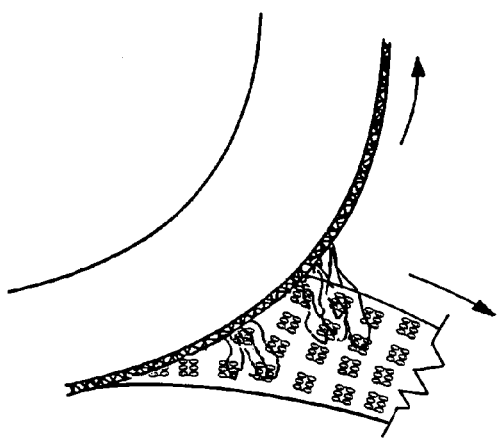

Referring to FIG. 46, a low-pile loop material 251 has a variety of loop sizes and a degree of loop entanglement. Referring to FIG. 47, initial engagement by a feature of a fastener element, e.g., a serrated fastener element, can aid in disentanglement of loops in the low-pile loop material 251, exposing them for engagement by other proximate features of the same fastening element. FIG. 48 shows the same effect with a fastener element that includes multiple, discrete fastening prongs. Referring to FIGS. 49 and 49A, during peeling action, dis-entanglement occurs and additional loops are captured and/or dropped loops are re-captured by proximate features that are, e.g., 0.001 inch to 0.012 inch away (0.0254-0.3048 mm), increasing engagement strength and reducing the likelihood of dis-engagement.

While certain embodiments have been described, other embodiments are possible. Accordingly, other embodiments are within the scope of the following claims.

For example, while FIG. 2 illustrates a fastener element that has head that includes a total of six serrations, a fastener element may contain less than six, or more than six serrations. For example, a head may contain, e.g., four, eight, ten, twelve, sixteen, or more, e.g., twenty serrations.

As another example, while embodiments have been described for forming heads that include a single heating of projections, and a single pass through a conformation station, these steps may be repeated one or more times to provide other head shapes.

What is claimed is:

1. A touch fastener component comprising:
a sheet-form base; and
an array of fastener elements comprising discrete, laterally and longitudinally spaced apart stems, extending upward from the sheet-form base, each fastener element including a corresponding stem integrally molded with and extending upward from the base, and multiple, discrete, fastening prongs extending upward from the corresponding stem, each prong including a lower portion integrally molded with and extending upward from the corresponding stem, and an upper portion, wherein the upper portion of multiple prongs of a single fastener element overhang a side of the lower portion of their fastener element in a common direction, for engaging loops, and wherein each fastener element includes greater than five fastening prongs.

2. The touch fastener component of claim 1, wherein greater than fifty percent of a top surface of each of the multiple, discrete, fastening prongs of each fastener element lie substantially in a single plane that is parallel the sheet-form base.

3. The touch fastener component of claim 2, wherein greater than seventy five percent of a top surface of each of the multiple, discrete, fastening prongs of each fastener element lie substantially in a single plane that is parallel the sheet-form base.

4. The touch fastener component of claim 3, wherein greater than ninety percent of a top surface of each of the multiple, discrete, fastening prongs of each fastener element lie substantially in a single plane that is parallel the sheet-form base.

5. The touch fastener component of claim 1, wherein a density of the multiple, discrete, fastening prongs is from about 1,000 to about 20,000 projections per square inch.

6. The touch fastener component of claim 5, wherein the density of the multiple, discrete, fastening prongs is from about 3,000 to about 12,000 projections per square inch.

7. The touch fastener component of claim 1, wherein a maximum thickness of the multiple, discrete, fastening prongs is from about 0.0005 inch to about 0.026 inch.

8. The touch fastener component of claim 1, wherein a maximum overhang of the multiple, discrete, fastening prongs is from about 0.0005 inch to about 0.010 inch.

9. The touch fastener component of claim 1, wherein the multiple, discrete, fastening prongs of each fastener element are in-line in a first direction.

10. The touch fastener component of claim 9, wherein the multiple, discrete, fastening prongs are in-line also in a second direction perpendicular to the first direction.

11. The touch fastener component of claim 1, wherein each fastener element has two rows of projections in a single direction.

12. The touch fastener component of claim 11, wherein each fastener element has three projections in each row.

13. A touch fastener component comprising:
a sheet-form base; and
an array of fastener elements extending upward from the sheet-form base, each fastener element including
a stem integrally molded with and extending upward from the base, and
a head overhanging multiple sides of the stem, the head having a substantially flat upper surface, the head also including multiple, discrete serrations extending laterally from a common side of the head in a common direction, and defining therebetween recesses sized to receive loop fibers engaged against surfaces of the serrations.

14. The touch fastener component of claim 13, wherein greater than fifty percent of the top surface of each head lies substantially in a single plane that is parallel the sheet-form base.

15. The touch fastener component of claim 14, wherein greater than seventy five percent of the top surface of each head lies substantially in a single plane that is parallel the sheet-form base.

16. The touch fastener component of claim 15, wherein greater than ninety percent of the top surface of each head lies substantially in a single plane that is parallel the sheet-form base.

17. The touch fastener component of claim 13, wherein each fastener element includes greater than five serrations.

18. The touch fastener component of claim 13, wherein a density of the multiple, discrete serrations is from about 1,000 to about 20,000 projections per square inch.

19. The touch fastener component of claim 18, wherein the density of the multiple, discrete serrations is from about 3,000 to about 12,000 projections per square inch.

20. The touch fastener component of claim 13, wherein a maximum thickness of the multiple, discrete serrations is from about 0.0005 inch to about 0.020 inch.

21. The touch fastener component of claim 13, wherein a maximum overhang of the multiple, discrete serrations is from about 0.0005 inch to about 0.010 inch.

22. A touch fastener component comprising:
a sheet-form base; and
an array of fastener elements comprising discrete, laterally and longitudinally spaced apart stems, extending upward from the sheet-form base, each fastener element including a corresponding stem integrally molded with and extending upward from the base, and multiple, discrete, fastening prongs extending upward from the corresponding stem, each prong including a lower portion integrally molded with and extending upward from the corresponding stem, and an upper portion, wherein the upper portion of multiple prongs of a single fastener element overhang a side of the lower portion of their fastener element in a common direction, for engaging loops, and wherein each fastener element has two rows of projections in a single direction.

23. The touch fastener component of claim 22, wherein greater than fifty percent of a top surface of each of the multiple, discrete, fastening prongs of each fastener element lie substantially in a single plane that is parallel the sheet-form base.

24. The touch fastener component of claim 23, wherein greater than seventy five percent of a top surface of each of the multiple, discrete, fastening prongs of each fastener element lie substantially in a single plane that is parallel the sheet-form base.

25. The touch fastener component of claim 24, wherein greater than ninety percent of a top surface of each of the multiple, discrete, fastening prongs of each fastener element lie substantially in a single plane that is parallel the sheet-form base.

26. The touch fastener component of claim 22, wherein each fastener element includes greater than five fastening prongs.

27. The touch fastener component of claim 22, wherein a density of the multiple, discrete, fastening prongs is from about 1,000 to about 20,000 projections per square inch.

28. The touch fastener component of claim 27, wherein the density of the multiple, discrete, fastening prongs is from about 3,000 to about 12,000 projections per square inch.

29. The touch fastener component of claim 22, wherein a maximum thickness of the multiple, discrete, fastening prongs is from about 0.0005 inch to about 0.026 inch.

30. The touch fastener component of claim 22, wherein a maximum overhang of the multiple, discrete, fastening prongs is from about 0.0005 inch to about 0.010 inch.

31. The touch fastener component of claim 22, wherein the multiple, discrete, fastening prongs of each fastener element are in-line in a first direction.

32. The touch fastener component of claim 31, wherein the multiple, discrete, fastening prongs are in-line also in a second direction perpendicular to the first direction.

33. The touch fastener component of claim 22, wherein each fastener element has three projections in each row.

* * * * *